(12) United States Patent
Shin et al.

(10) Patent No.: US 10,380,784 B2
(45) Date of Patent: Aug. 13, 2019

(54) ELECTRONIC APPARATUS FOR MAPPING TEXTURE IMAGE AND GENERATING BLENDING IMAGE

(71) Applicant: SAMSUNG ELECTRONICS CO., LTD., Suwon-si, Gyeonggi-do (KR)

(72) Inventors: Seung-ho Shin, Suwon-si (KR); Soo-wan Park, Suwon-si (KR); Joon-seok Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/218,217

(22) Filed: Jul. 25, 2016

(65) Prior Publication Data

US 2017/0046869 A1     Feb. 16, 2017

Related U.S. Application Data

(60) Provisional application No. 62/203,555, filed on Aug. 11, 2015.

(30) Foreign Application Priority Data

Apr. 29, 2016  (KR) .................. 10-2016-0053325

(51) Int. Cl.
    *G06T 15/04* (2011.01)
    *G06T 15/50* (2011.01)
    *G06T 7/40* (2017.01)

(52) U.S. Cl.
    CPC .......... *G06T 15/04* (2013.01); *G06T 7/40* (2013.01); *G06T 15/503* (2013.01); *G06T 2210/56* (2013.01)

(58) Field of Classification Search
    CPC ...................................... G06T 14/04
    USPC ............................................... 345/582
    See application file for complete search history.

(56) References Cited

U.S. PATENT DOCUMENTS

2015/0161810 A1* 6/2015 Macklin ............... G06T 13/60
                                                                345/474

FOREIGN PATENT DOCUMENTS

JP        2001-148031 A      5/2001

OTHER PUBLICATIONS

Bagar, Florian, Daniel Scherzer, and Michael Wimmer. "A Layered Particle-Based Fluid Model for Real-Time Rendering of Water." Computer Graphics Forum 29.4 (2010): 1383-1389.*
Korean Office Action for Application No. 10-2016-0053325 dated Jun. 26, 2017 (7pgs).
"Smoothed Particle Hydrodynamics on GPUs" Harada et al., The Visual Computer, 2007 (8pgs).

* cited by examiner

*Primary Examiner* — Shivang I Patel
(74) *Attorney, Agent, or Firm* — Nixon & Vanderhye P.C.

(57) ABSTRACT

Provided herein is an electronic apparatus including a storage configured to store a texture image representing a characteristic of a particle of an object; and a processor configured to map the texture image to a plurality of locations where the particle exists and to generate a blending image by blending the mapped texture images, and to render the object based on the blending image.

7 Claims, 9 Drawing Sheets

ELECTRONIC APPARATUS FOR MAPPING TEXTURE IMAGE AND GENERATING BLENDING IMAGE

CROSS-REFERENCE TO RELATED APPLICATIONS

This application is based on and claims priority under 35 U.S.C. § 119 to Korean Patent Application No. 10-2016-0053325, filed on Apr. 29, 2016, in the Korean Intellectual Property Office, and U.S. Provisional Application No. 62/203,555, filed on Aug. 11, 2015, in the United States Patent and Trademark Office, the disclosures of which are incorporated by reference herein in their entireties.

BACKGROUND

Field

Disclosed apparatuses and methods relate generally to an electronic apparatus and a rendering method thereof, and for example, to an electronic apparatus having a functionality of rendering an object using a particle system, and a rendering method thereof.

Description of Related Art

Due to the development of electronic technology, various types of display devices are being developed. Especially, electronic apparatuses such as TVs, PCs, laptop computers, tablet PCs, mobile phones, and MP3 players and the like have grown so much in demand that they are being used in most households.

Recently, in order to meet the users' needs for more novel and various functions, efforts are being made to develop electronic apparatuses in more novel forms.

Meanwhile, in order to provide more convenient and intuitive use environment, the importance of user interfaces (UI) and user experience (UX) is increasing.

Especially, electronic devices combined with abundant sentiment are known to significantly arouse consumers' purchasing demand.

There is a method of providing opportunities to experience nature or daily lives in order to elicit the sentiment of users, for example, the ripple effect where ripples are made on a surface of water, watercolor painting effect, and water drop effect, etc.

In order to express the aforementioned effects, physics-based techniques such as particle physics simulation are needed.

These physics-based techniques require a large amount of operations to calculate the density and the repulsion, etc. of particles, which may lead to increased power consumption and non-real time operations due to a slow down of the operation speed.

Therefore, the need has risen to reduce the amount of operation of the physics-based techniques.

SUMMARY

Therefore, an aspect of the present disclosure is to address the aforementioned problems of conventional technology, that is, to provide an electronic apparatus capable of efficiently performing physics simulation and object rendering on a particle system, and a rendering method thereof.

According to an example embodiment of the present disclosure, an electronic apparatus includes a storage configured to store a texture image representing a characteristic of a particle of an object; and a processor configured to map the texture image to a plurality of locations where the particle exists and to generate a blending image by blending the mapped texture images, and to render the object based on the blending image.

Here, the characteristic of the particle may include an operation result of a kernel function for computing at least one of a density and a viscosity between the particles existing in the plurality of locations.

In this case, when at least a portion of the mapped texture images overlap each other such that the mapped texture images are differentiated into an overlap area and a non-overlap area, the processor may determine a characteristic value of a pixel of an area of the blending image corresponding to the overlap area by summing up the characteristic value of the pixel of the overlap area, and determine the characteristic value of the pixel of the area of the blending image corresponding to the non-overlap area with the characteristic value of the pixel of the non-overlap area.

Further, the processor may determine the area that includes the pixel having the characteristic value of or more than a predetermined critical value as the area on which the object is to be rendered in the blending image, and may render the object in the determined area.

Further, the processor may render an object that is different from the object in the area that includes the pixel having a smaller characteristic value than the predetermined critical value.

Further, the processor may render the object that is different from the object using a rendering method that requires a relatively smaller amount of operation than a predetermined rendering method used for rendering the object.

According to another example embodiment of the present disclosure, a rendering method may include mapping a texture image representing a characteristic of a particle of an object in a plurality of locations where the particle of the object exists; generating a blending image by blending the mapped texture images; and rendering the object based on the blending image.

Here, the characteristic of the particle may include an operation result of a kernel function for computing at least one of a density and viscosity between the particles existing in the plurality of locations.

In this case, the rendering method may further include, when at least a portion of the mapped texture images overlap each other such that the mapped texture images are differentiated into an overlap area and a non-overlap area, determining a characteristic value of a pixel of an area of the blending image corresponding to the overlap area by summing up the characteristic value of the pixel of the overlap area, and determining the characteristic value of the pixel of the area of the blending image corresponding to the non-overlap area with the characteristic value of the pixel of the non-overlap area.

Further, the rendering method may further include determining the area including the characteristic value of or more than a predetermined critical value in the blending image as the area where the object is to be rendered, and rending the object in the determined area.

Further, the rendering method may further include determining the area including the pixel having the characteristic value of or more than a predetermined critical value as the area on which the object is to be rendered in the blending image, and rendering the object in the determined area.

In this case, the rendering method may further include rendering an object that is different from the object in the area that includes the pixel having a smaller characteristic value than the predetermined critical value.

In this case, wherein the rendering the object that is different from the object may render the different object using a rendering method that requires a relatively smaller amount of operation than the predetermined rendering method used for rendering the object.

According to the various aforementioned example embodiments of the present disclosure, it is possible to efficiently perform physics simulating and object rendering on a particle system.

BRIEF DESCRIPTION OF THE DRAWINGS

The above and/or other aspects will be more apparent from the following detailed description, taken in conjunction with the accompanying drawings, in which like reference numerals refer to like elements, and wherein.

DETAILED DESCRIPTION

Hereinafter, various example embodiments of the present disclosure will be described in greater detail with reference to the accompanying drawings.

First, terms used in the description and in the claims are general terms selected in consideration of the functions in various embodiments. However, these terms may vary depending on intentions or technical interpretation and emergence of new technologies and the like of one skilled in the related art. Further, some terms may have been selected arbitrarily. Such terms may be construed as meaning as defined in the description, and unless specifically defined herein, those terms may be construed based on the overall contents of the present disclosure and common technological sense of the related art.

Further, like reference numerals or symbols disclosed in each of the drawings attached to the description represent parts or configurative elements performing substantially like functions. For convenience of explanation and understanding, different embodiments will be explained using identical reference numerals or symbols. That is, even if a plurality of drawings illustrate configurative elements having identical reference numerals, it does not mean that the plurality of drawings represent only one embodiment.

In the description, a singular representation includes representation of a plurality thereof, unless meaning otherwise in the context. It should be understood that terms such as "comprise" and "consists of" herein are used to designate existence of a feature, number, step, operation, configurative element, part or a combination thereof disclosed in the description, and not to pre-exclude the existence or possible addition of one or more other features, numbers, steps, operations, configurative elements, parts or a combination thereof.

In the embodiments of the present disclosure, terms such as "module", "unit" and "part" and the like are terms for indicating configurative elements performing at least one function or operation, which configurative elements may be realized as hardware or software or a combination thereof. Furthermore, a plurality of "modules", "units" "parts" and the like may be integrated in at least one module or chip and be realized as at least one processor (not illustrated) except for when they need to be realized as certain individual hardware, Further, in the embodiments of the present disclosure, when it is disclosed that a part is connected to another part, it may include not only a case where the part is directly connected to another part, but also a case where the part is indirectly connected to the another part by another medium. Further, when it is disclosed that a certain part includes a certain configurative element, it does not mean that other configurative elements are excluded but that other configurative elements may be further included, unless particularly disclosed otherwise.

Besides the aforementioned, in cases where it is determined that a detailed explanation on a well-known function or configuration may unnecessarily obscure the gist of the present disclosure, detailed explanation thereof may be abbreviated or omitted.

Hereinafter, an example embodiment of the present disclosure will be explained in greater detail with reference to the drawings attached.

Figure 1:
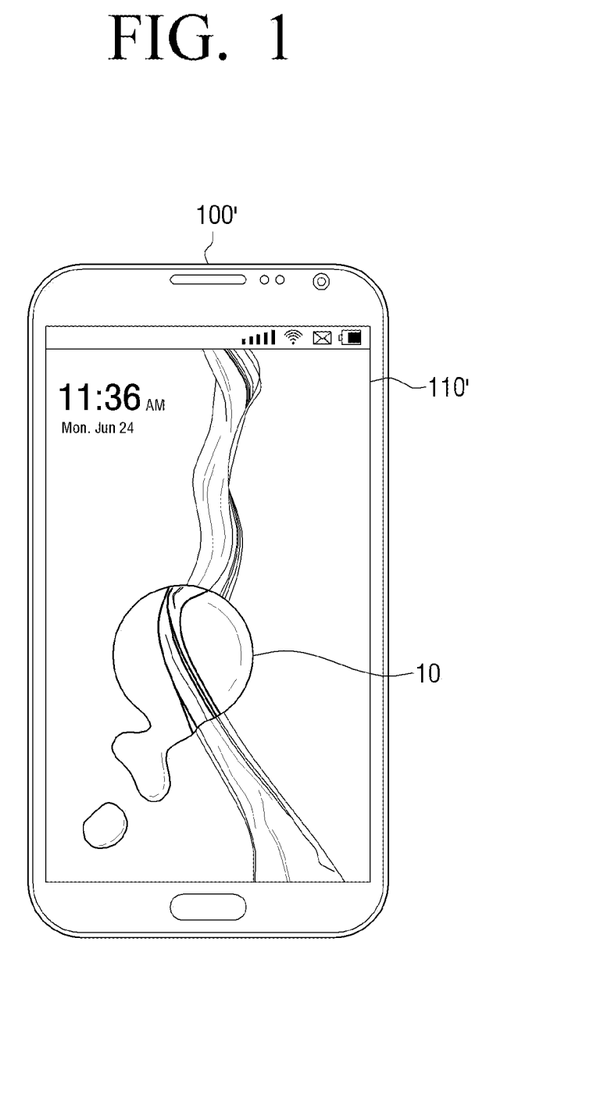
FIG. 1 is a diagram illustrating an example lock screen of an electronic apparatus according to an example embodiment of the present disclosure.

FIG. 1 is a diagram illustrating an example lock screen of an electronic apparatus according to an example embodiment of the present disclosure.

In FIG. 1, it is illustrated that the electronic apparatus 100' is realized in a mobile phone form, but it may be realized in other various forms instead. For example, the electronic apparatus 100' may be realized in various ways as, for example, a TV, a PC, a tablet PC, a laptop PC, a PDA, an MP3, an electronic dictionary, and an e-book, etc.

The real world is made of attributes such as movements and chaos of particles. A particle system is a system devised to apply these physical attributes to a virtual world. The particle system is used to realize various textures in pre-rendered visual effects that can be found in real time application programs, movies, and advertisements, etc.

The most representative particle physics simulation method is Smoothed Particle Hydrodynamics (SPH) which calculates attributes between particles (for example, density and viscosity, etc.) using kernel functions.

One example of the kernel function is the density operation kernel function as in math equation 1 below.

$$W_{poly}(r, h) = \frac{315}{64\pi h^9} \begin{cases} (h^2 - r^2)^3 & 0 \le r \le h \\ 0 & \text{otherwise} \end{cases} \quad \text{[Equation 1]}$$

Where r: distance between particles, h: size of kernel function.

The electronic apparatus 100' operates a weight (result value of the kernel function) for each of the particles distributed in a certain space. In this case, the electronic apparatus 100' may be provided with the weight of each particle, that is, the result of operation of the kernel function in a texture image form. This will be explained in detail hereinbelow.

Next, the electronic apparatus 100' may input the result value of operation into a density operation function such as in math equation 2 below, and compute a density distribution of the particles.

$$P_i = \sum_j m_j W(r_i - r_j, h) \qquad \text{[Equation 2]}$$

Where ρ: density, m: mass, W: kernel function, r: distance between particles, h; size of kernel function.

The electronic apparatus 100' may perform rendering of a water drop object 10 based on the density operation result. This will be explained in greater detail hereinafter.

Hereinabove was a rough explanation on a process in which the water drop object 10 is rendered in the electronic apparatus 100'. Hereinafter, a process of computing the characteristics of the particles constituting the object will be explained by way of simulation, and a process of rendering the object according to the result thereof will be explained in detail by way of example.

Figure 2:
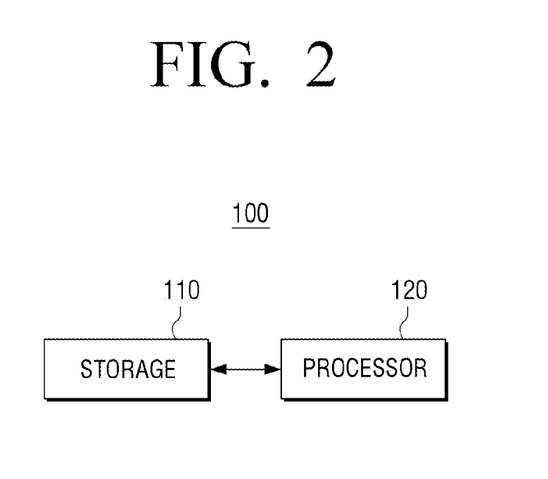
FIG. 2 is a block diagram illustrating an example configuration of the electronic apparatus according to an example embodiment of the present disclosure.

FIG. 2 is a block diagram illustrating an example configuration of an electronic apparatus according to an example embodiment of the present disclosure. Here, repeated explanation on the contents hereinabove will be omitted.

According to FIG. 2, the electronic apparatus 100 includes a storage 110 and a processor 120.

The storage 110 stores various pieces of data used to drive the electronic apparatus 100. Especially, the storage 110 may store characteristics of object particles. For example, the storage 110 may store the particle characteristics of an object in, for example, a texture image 30 form as illustrated in FIG. 3.

Here, the characteristics of particles of the object include an operation result for computing at least one of a density and viscosity between the particles existing in a plurality of locations. In other words, the particle characteristics of the object may be a weight value of a kernel function for computing at least one of the density and viscosity. Hereinafter, explanation will be made by way of an example of the density of particles of the characteristics of the particles.

Figure 3:
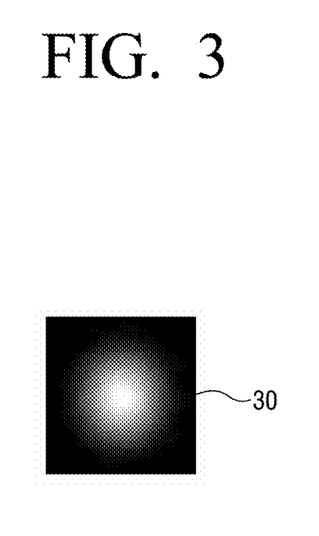
FIG. 3 is a view diagram illustrating an example texture image according to an example embodiment of the present disclosure.

Referring to FIG. 3, the texture image 30 stores a result of the density operation kernel function corresponding to at least one particle. For example, the texture image 30 is made up of a collection of pixels, wherein a result value of the kernel function that each area of the texture image 30 represents may be matched to a pixel corresponding to each area of the texture image 30, and be stored. Here, the result value of the kernel function being matched to the pixel and stored is defined as a characteristic value of the pixel.

The closer it is to a center of a normal particle, the greater the value of the density kernel function, and the farther away it is from the center of the normal particle, the smaller the value of the density kernel function. Likewise, the closer it is to the center of the texture image 30 matching the center of the particle, the greater the weight value of the texture image 30, thereby brighter, and more farther away it is from the center of the texture image 30, the smaller the weight value of the texture image 30, thereby darker. This will be explained with reference to FIGS. 4A and 4B by way of example.

Figure 4A:
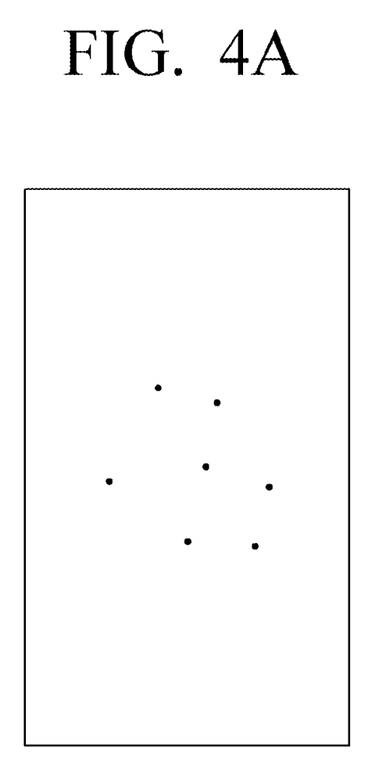
FIGS. 4A and 4B are diagrams illustrating an example of blending of a texture image according to an example embodiment of the present disclosure.
Figure 4B:
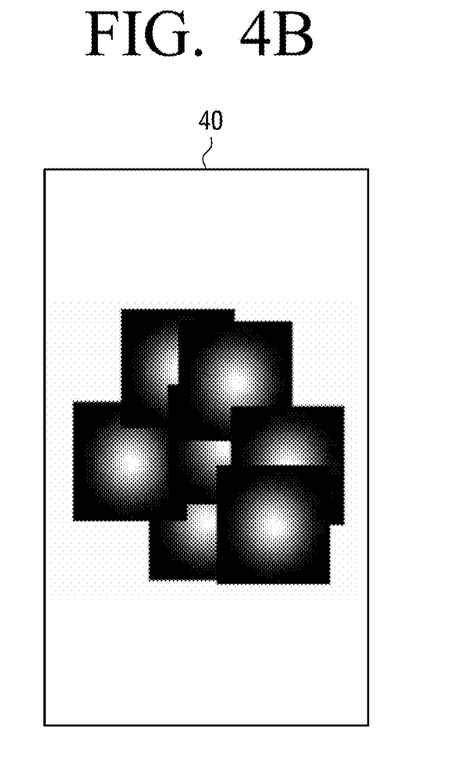

FIGS. 4A and 4B are diagrams illustrating an example of blending of the texture image according to an example embodiment of the present disclosure.

The processor 120 may perform blending of the texture image 30, and determine the density distribution of the particle.

Specifically, the processor 120 may map the texture image 30 in a plurality of locations where the particles exist, and blend the mapped texture images to create a blending image.

Referring to FIG. 4A, there are a plurality of particles scattered in a certain area. Although it shows an example where a small number of particles are scattered, in reality, numerous particles may be distributed in a certain area.

The processor 120 places the center of the texture image 30 in each of the locations of the plurality of particles and accumulates the same, and blends as many numbers of the texture image 30 as that of the plurality of particles. Here, blending may mean the process where a texture image value is accumulated on a buffer of the graphic processing unit (GPU). In such a case, when a plurality of mapped texture images are overlapped, the blending image 40 includes a result of summing the characteristics values of the pixels in the overlap area.

Specifically, in the case where texture images 30 of which at least a portion overlap each other and mapped are differentiated into an overlap area and a non-overlap area, the processor 120 may sum up the characteristic values of the pixels of the overlap area and may determine the characteristic values of the pixels of the area of the blending image 40 corresponding to the overlap area, and determine the characteristic values of pixels of the area of the blending image 40 corresponding to the non-overlap area with the characteristic values of the pixel of the overlap area.

Although explanation hereinabove was made on an example of simulating the density characteristics of the particles, it is also possible to simulate other characteristics of the particles as well. For example, it is also possible to store the result values of the kernel function relating to the viscosity of the particles below in the texture image, and blend the texture image to compute the viscosity characteristics of the particles.

$$W_{viscosity}(r, h) = \frac{15}{2\pi h^3} \begin{cases} -\frac{r^3}{2h^3} + \frac{r^2}{h^2} + \frac{h}{2r} - 1 & 0 \le r \le h \\ 0 & \text{otherwise} \end{cases} \qquad \text{[Equation 3]}$$

Where r: distance between particles, h: size of kernel function.

Meanwhile, although explanation hereinabove on the simulation of the particle system was explained by way of example of the particle system, there is no limitation thereto. For example, the aforementioned simulation method may also be applicable to a simulation for expressing movements between planets in the universe.

Meanwhile, the processor 120 may render an object (not illustrated) such as, for example, a water drop based on the blending image 40 which is the density operation result of the particles. This will be explained in greater detail with reference to FIGS. 5 and 6.

Figure 5:
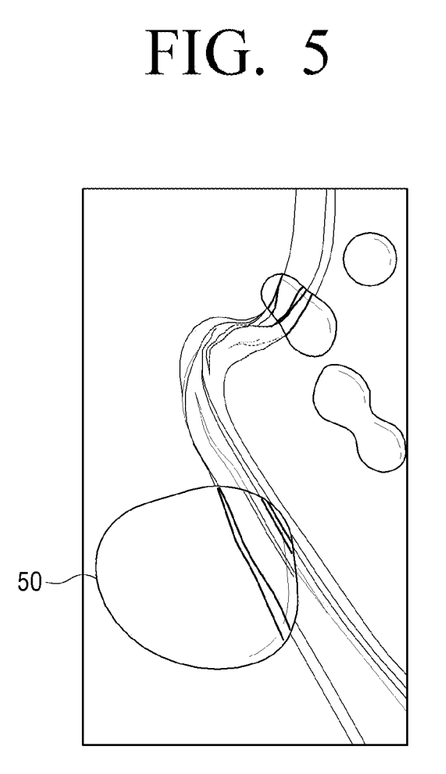
FIG. 5 is a diagram illustrating an example method of determining a shape of a water drop object according to an example embodiment of the present disclosure.

FIG. 5 is a diagram illustrating an example method for determining the shape of the water drop object according to an example embodiment of the present disclosure.

First, the processor 120 may determine the area of the water drop object 50 for the rendering. For this purpose, the processor 120 may use the characteristic values of the pixels of the blending image 40.

Specifically, from the fact that an area having a great characteristic value of the pixel of the blending image 40 is where the pixels have a high density, the processor 120 may determine that an area with a characteristic value of the pixel greater than a predetermined critical value is an area that belongs to the water drop object 50. Here, the predetermined critical value may be predetermined and stored in the system, or be changed according to an input of the user. Consequently, the processor 120 may determine a shape of an area 50 of which the characteristic value of the pixel is greater than the critical value as the shape of the water drop object 50.

Figure 6:
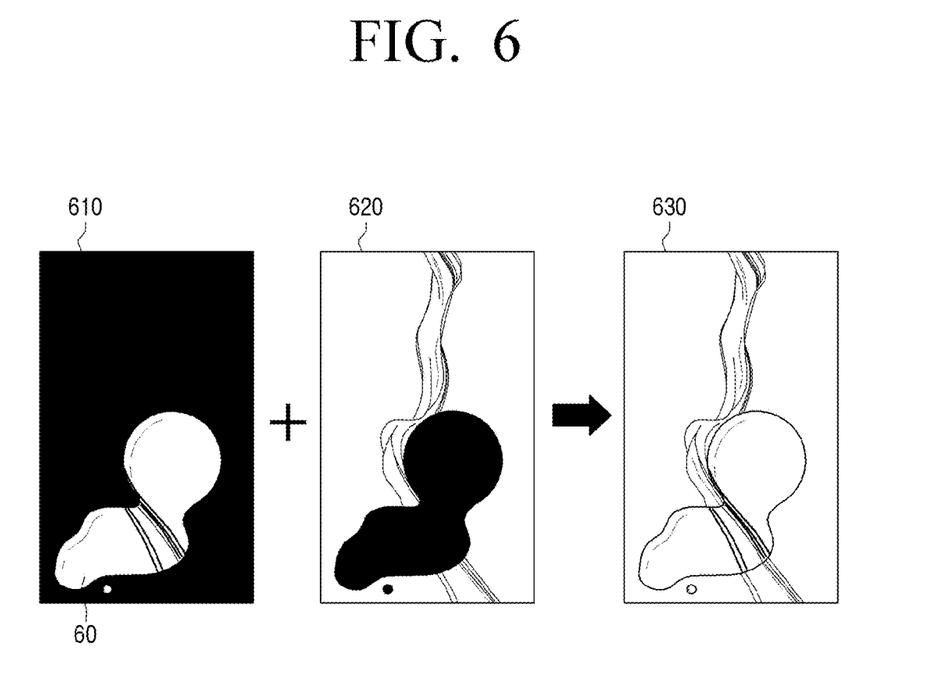
FIG. 6 is a diagram illustrating an example rendering of the water drop object according to an example embodiment of the present disclosure.

FIG. 6 is a diagram illustrating an example of rendering of the water drop object according to an example embodiment of the present disclosure.

When the shape 60 of the water drop object is determined as aforementioned, the processor 120 may perform the rendering based on the determined shape of the object 60. Here, the rendering for the area determined as the water drop object 60 and for the area determined not as the water drop object 60 area may be performed in different methods.

For example, the processor 120 determines the area that includes the pixels having the characteristics of or above the predetermined critical value in the blending image as an area where the object 60 should be rendered, and performs rendering of the object 60 in the determined area.

Here, the processor 120 may perform a high-operational rendering on the object area 60. The high-operational rendering refers to, in the case of the water drop object, for example, rendering effects such as reflection, refraction and the like inside the water drop. A shader operation that is used to provide special effects to an object is one example of the high-operational rendering.

Meanwhile, in the area that includes the pixel having a smaller characteristic value than the predetermined critical value, the processor 120 may render an object other than the object 60. Here, another object may be an area (for example, background screen) besides the area corresponding to the water drop object 50 inside the image 110' that is subject to the rendering. In this case, the processor 120 may render the another object using a rendering method that requires relatively less amount of operation compared to the predetermined rendering method used to render the object 60.

Referring to FIG. 6, the processor 120 performs the high-operational rendering on the area of the object 60. Further, the processor 120 performs a low-operational rendering on an area other than the area of the object 60. Here, in order to perform the low-operational rendering, the processor 120 may copy a screen used as the background to the area other than the object 60 without performing the rendering operation on the area other than the object 60.

Consequently, the processor 120 may create a final rendering image by combining the image to which the rendering of the object 60 was performed and the image to which the rendering of the object other than the object 60 was performed.

So far, the embodiment of the rendering method of the object was explained. According to the aforementioned embodiment of the present disclosure, by performing a simulation using the texture image and performing rendering in a differentiated manner between the area corresponding to the object and the area besides thereof, thereby significantly reducing the amount of operation for rendering the image.

Meanwhile, the embodiment of the present disclosure is not limited to rendering the object using the density operation of the particles.

For example, the processor 120 may blend the texture image that includes the result of operation of the kernel function regarding the density and compute a density distribution, and perform blending operation regarding the pressure and viscosity of the particles based on the density distribution. Accordingly, when the object is rendered, the processor 120 may operate the motion direction, velocity and acceleration and the like of particles of the object and express the movement of the object.

Figure 7:
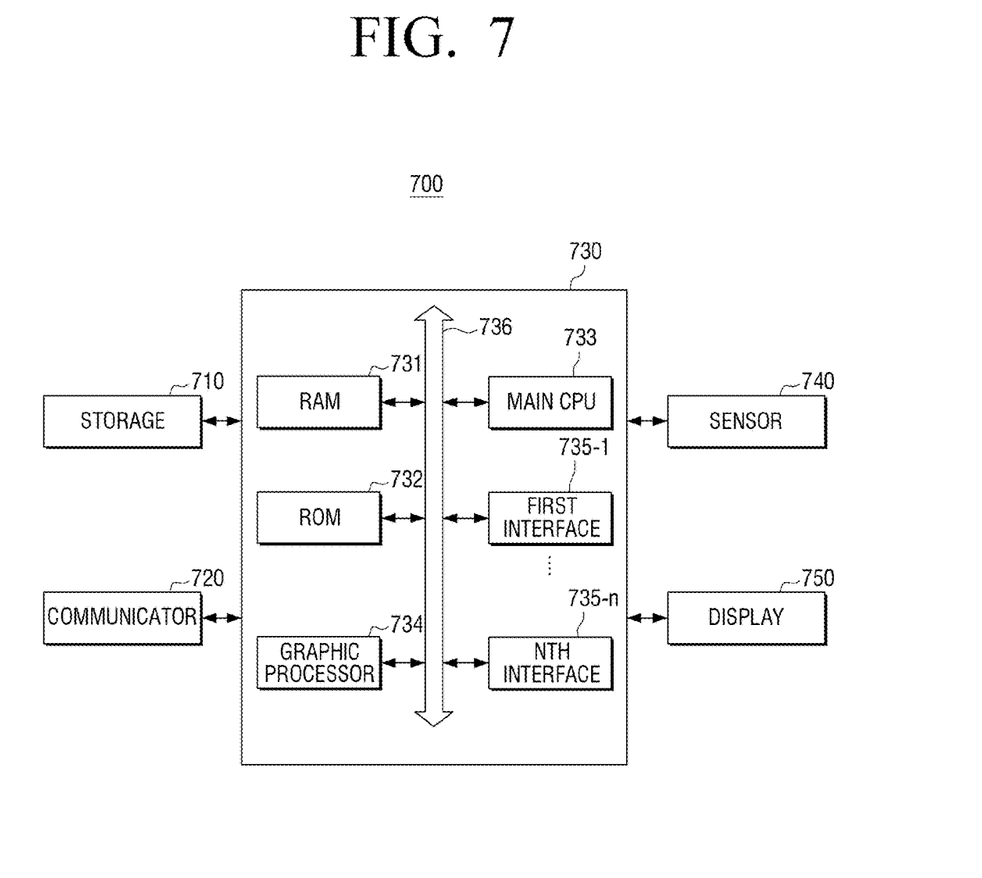
FIG. 7 is a block diagram illustrating an example configuration of the electronic apparatus realized as a mobile phone according to an example embodiment of the present disclosure.

FIG. 7 is a block diagram illustrating an example configuration of the electronic apparatus in the case where the electronic apparatus according to an example embodiment of the present disclosure is realized as a mobile phone.

FIG. 7 is a comprehensive illustration of various configurative elements that are mountable in the case where the electronic apparatus 700 is realized as an electronic apparatus 700 that comprehensively supports various functions such as a communication function, GPS receiving function, and display function and the like. Therefore, in some embodiments, some of the configurative elements illustrated in FIG. 7 may be omitted or changed, and other configurative elements may be further added. Here, explanation on configurations that overlap those of the aforementioned electronic apparatus 100 will be omitted.

The electronic apparatus 700 may include a storage 710, a communicator (e.g., including communication circuitry) 720, a controller 730, a sensor 740, and a display 750.

The storage 710 may store various data such as an operating system (O/S) software module, and various multimedia contents for driving the electronic apparatus 700.

Especially, the storage 710 stores a WPS module and a cell module, and provides the WPS module and the cell module to the processor 730. Further, the storage 710 stores a texture image for rendering an object.

The communicator 720 performs communication with various types of external apparatuses according to various types of communication methods. For this purpose, the communicator 720 may include various communication circuitry, such as, for example, and without limitation, communication chips such as a Wifi chip (not illustrated), a Bluetooth chip (not illustrated), and a wireless communication chip (not illustrated) and the like.

The controller 730 is a configurative element for controlling the overall operations of the electronic apparatus 700 using various programs stored in the storage 710. According to FIG. 7, the controller 730 includes a RAM 731, a ROM 732, a main CPU 733, a graphic processor 734, and a first to nth interface 735-1~735-n.

The RAM 731, the ROM 732, the main CPU 733, the graphic processor 734, and the first to nth interface 735-1~735-n and the like may be connected to each other through a bus 736.

The first to nth interface 735-1 to 735-n are connected to various configurative elements. One of the interfaces may be a network interface being connected to an external apparatus through a network.

The main CPU 733 may access the storage 710, and perform booting using the O/S and ROM 732 stored in the storage 710. The main CPU 733 may call in various modules stored in the storage 710, and store the various modules in the RAM 731, and perform various functions using the stored module. Further, the main CPU 733 may perform various operations using various programs, contents and data, etc. stored in the storage 710. The main CPU 733 may perform a role corresponding to the processor mentioned in the aforementioned various embodiments.

In the ROM 732, command sets and the like for system booting may be stored. When a turn-on command is input and power is supplied, the main CPU 733 may copy the O/S stored in the storage 710 in the RAM 732, and execute the O/S to boot the system. When the booting is completed, the main CPU 733 may copy various application programs stored in the storage 710 in the RAM 731, and execute the application program copied in the RAM 731 and perform various operations.

Meanwhile, when the display 750 to be explained hereinafter is touched, a water drop may be rendered in the touch area.

For example, the processor 730 may generate a water drop along the area being touch and dragged or move the water drop and render the same. In this case, the processor 120 may change the thickness of the water drop and render the same, or perform the rendering such that colors from one area to other areas of the water drop are gradated.

The graphic processor 734 generates a screen that includes various objects such as an icon, an image, and text and the like using the operator (not illustrated) and renderer (not illustrated). The operator (not illustrated) operates attribute values such as a coordinate value, shape, size, and color in which each object is to be displayed according to the layout of the screen based on the received control command. The renderer (not illustrated) generates screens of various layouts including the object based on the attribute value operated in the operator (not illustrated). The screen generated in the renderer (not illustrated) is displayed on the display 750. The graphic processor 734 performs UI rendering as well. Specifically, when the main CPU 733 changes the OS, the graphic processor 734 uses the graphic data corresponding to the changed OS, configures the layout screen of the changed OS and displays the configured layout screen on the display 750.

The sensor 740 includes various sensors. The sensor 740 may further include various sensors such as a touch sensor (not illustrated) and proximity sensor (not illustrated) and the like besides the aforementioned GPS sensor, gyro sensor, acceleration sensor, and terrestrial sensor.

Specifically, the touch sensor (not illustrated) may be realized as a capacitive or resistive touch sensor. The capacitive touch sensor method is a method of sensing minute electricity being applied to a user's body when a portion of the user's body touches a dielectric coated on the surface of the display 750 and computing a touch coordinate. The resistive touch sensor includes two electrode plates so that when the user touches the screen, an upper and lower plate of the touched point sense a current flowing, to compute a touch coordinate.

The proximity sensor (not illustrated) is a sensor for sensing an approaching motion without directly contacting a surface of the display 750. The proximity sensor (not illustrated) may be realized in various types of sensors such as a high frequency oscillation type sensor wherein a high frequency magnetic field is formed to sense a current being induced by magnetic field characteristics changing when an object approaches, a magnetic type sensor that uses a magnet, and a capacitance type sensor that senses the amount of capacitance changed by an approach of an object.

The display 750 displays an image being generated by an operating system and an application. Specifically, the display 750 may display various screens being generated in the graphic processor 743. For this purpose, the display 750 may be realized as a liquid crystal display (LCD), and an organic light emitting display (OLED), and the like.

Furthermore, although not illustrated in FIG. 7, the electronic apparatus 700 may further include a camera (not illustrated) and a microphone (not illustrated) and the like.

Figure 8:
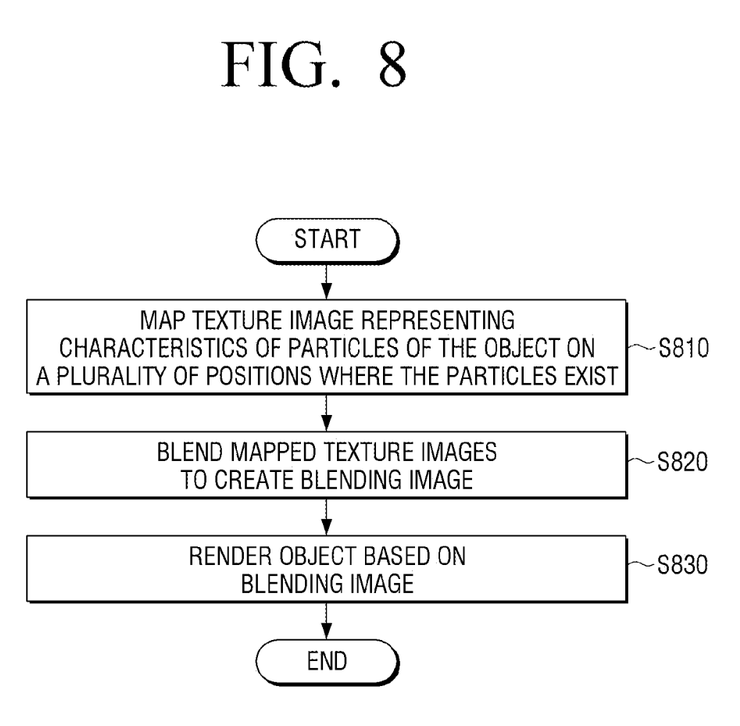
FIG. 8 is a flowchart illustrating an example rendering method of the electronic apparatus according to an example embodiment of the present disclosure.

FIG. 8 is a flowchart illustrating an example rendering method of the electronic apparatus 100 according to an example embodiment of the present disclosure.

First, the rendering method maps a texture image representing characteristics of the particles of the object in a plurality of locations where the particles of the object exist (S810), blends the mapped texture images and creates a blending image (S820), and renders the object based on the blending image (S830).

Here, the characteristics of the particles may include an operational result of the kernel function for computing at least one of the density and viscosity between the particles existing in a plurality of locations.

In this case, when at least a portion of the mapped texture images overlap each other, and thus the mapped texture images are differentiated into an overlap area and a non-overlap area, it is possible to sum up the characteristic values of the pixels of the overlap area to determine the characteristic value of the pixel of the area of the blending image corresponding to the overlap area, and determine the characteristic value of the pixel of the area of the blending image corresponding to the non-overlap area with the characteristic value of the pixel of the non-overlap area.

Further, the rendering method may further include determining an area including the pixel having a characteristic value of or more than the predetermined critical value in the blending image as an area where the object is to be rendered, and rending the object in the determined area.

Further, the rendering method may further include rendering an object that is different from the object in the area including the pixel having a smaller characteristic value than the predetermined critical value.

Here, the rendering an object that is different from the object may render the different object using a rendering method that requires a relatively less amount of operation than the predetermined rendering method used to render the object.

Meanwhile, the aforementioned rendering method of the electronic apparatus 100 according the aforementioned various example embodiments of the present disclosure may be realized in a program code executable in a computer and may be stored in various non-transitory computer readable media and may be provided to each server or apparatus so as to be executed by the processor 120.

For example, there may be provided a non-transitory computer readable medium which stores a program configured to perform mapping a texture image representing a characteristic of a particle of an object in a plurality of locations where the particle of the object exists, generating a blending image by blending the mapped texture images, and rendering the object based on the blending image.

A non-transitory computer readable medium refers to a computer readable medium that stores data semi-permanently. Specifically, the aforementioned various applications or programs may be stored in a non-transitory computer readable medium such as a CD, DVD, hard disk, blueray disk, USB, memory card, ROM and the like, and be provided.

The foregoing example embodiments and advantages are merely examples and are not to be construed as limiting the disclosure. The present teaching can be readily applied to other types of apparatuses. Also, the description of the example embodiments of the disclosure is intended to be illustrative, and not to limit the scope of the claims, and many alternatives, modifications, and variations will be apparent to those skilled in the art.

What is claimed is:

1. An electronic apparatus for rendering an image, the electronic apparatus comprising:
a storage configured to store a texture image representing a characteristic of a particle; and
a processor configured to:
map the texture image to a plurality of positions where the particle exists on the image,
generate a blending image by blending the mapped texture images,
determine a characteristic value of each pixel of the blending image, based on the characteristic of the particle;
determine an object region including a pixel which corresponds to a characteristic value higher than a predetermined value, from among a plurality of pixels of the blending image, wherein the object region corresponds to a shape of an object corresponding to the characteristic of the particle;
render the object region according to a first rendering method regarding the object and render a remaining region of the image excluding the object region according to a second rendering technique, and
wherein the second rendering technique requires a smaller amount of operations than does the first rendering technique.

2. The electronic apparatus according to claim 1, wherein a characteristic of the particle upon which the texture image is based comprises a result of an operation of a kernel function for determining at least one of a density and a viscosity between the particles existing in the plurality of locations.

3. The electronic apparatus according to claim 1, wherein, when at least a portion of the mapped texture images overlap each other such that the mapped texture images are differentiated into an overlap area and a non-overlap area, the processor is configured to determine a characteristic value of a pixel of an area of the blending image corresponding to the overlap area by summing up the characteristic value of the pixel of the overlap area, and to determine the characteristic value of the pixel of the area of the blending image corresponding to the non-overlap area with the characteristic value of the pixel of the non-overlap area.

4. The electronic apparatus of claim 1, wherein the objection region relates to an object having a fluid property corresponding to the characteristic of the particle.

5. A rendering method for rendering an image, the method comprising:
mapping a texture image corresponding to a particle in a plurality of positions where the particle exists on the image;
generating a blending image by blending the mapped texture images;
determining a characteristic value of each pixel of the blending image, based on the characteristic of the particle;
determining an object region including a pixel which corresponds to a characteristic value higher than a predetermined value, from among a plurality of pixels of the blending image, wherein the object region corresponds to a shape of an object corresponding to the characteristic of the particle;
rendering the object region according to a first rendering method regarding the object and rendering a remaining region of the image excluding the object region according to a second rendering method, and
wherein the second rendering method requires a smaller amount of operations than does the first rendering method.

6. The rendering method according to claim 5, wherein a characteristic of the particle upon which the texture image is based comprises a result of an operation of a kernel function for determining at least one of a density and viscosity between the particles existing in the plurality of locations.

7. The rendering method according to claim 5, further comprising, when at least a portion of the mapped texture images overlap each other such that the mapped texture images are differentiated into an overlap area and a non-overlap area, determining a characteristic value of a pixel of an area of the blending image corresponding to the overlap area by summing up the characteristic value of the pixel of the overlap area, and determining the characteristic value of the pixel of the area of the blending image corresponding to the non-overlap area with the characteristic value of the pixel of the non-overlap area.

* * * * *